United States Patent [19]

Pflieger

[11] 3,992,950

[45] Nov. 23, 1976

[54] WHEEL BALANCING DEVICE

[76] Inventor: Theodore Joseph Pflieger, 1247 Dunbar Road, Burlington, Ontario, Canada

[22] Filed: Jan. 12, 1976

[21] Appl. No.: 648,495

Related U.S. Application Data

[63] Continuation-in-part of Ser. No. 574,227, May 5, 1975, abandoned, which is a continuation of Ser. No. 426,374, Dec. 19, 1973, abandoned.

[52] U.S. Cl. .................................................. 73/486
[51] Int. Cl.² ........................................... G01M 1/12
[58] Field of Search ...................... 73/484, 485, 486

[56] References Cited
UNITED STATES PATENTS

| | | | |
|---|---|---|---|
| 2,172,006 | 9/1939 | Buckner et al. ..................... | 73/486 |
| 2,919,582 | 1/1960 | Riedel................................. | 73/484 |
| 3,036,468 | 5/1962 | Anderson............................ | 73/486 |

*Primary Examiner*—Herbert Goldstein
*Attorney, Agent, or Firm*—Hirons & Rogers

[57] ABSTRACT

A suspension type static balancing device for rotatable bodies such as automobile wheel and tire assemblies, the device comprising a suspended element which can be seated upon a horizontal surface and will have an annular flat face upon which a wheel to be balanced is placed with its hub orifice substantially concentric with the central orifice in the plate. A vertical tube protrudes upwardly through the orifice in the plate centrally of the orifice from the base of an inverted cone member having the annular plate connected to its rim. A flexible suspension cable has its lower end anchored within the lower portion of the tube and extends upwardly through the tube for attachment to an overhead support. The supported wheel is centered with the vertical tube for balancing by means of a centering member of inverted frustro-conical form slidably carried upon the tube and manually movable to closely fit within the hub orifice. Provision is made for the anchoring attachment of the lower end of the cable to be vertically adjusted, so as to adjust the sensitivity of the device to a satisfactory value.

4 Claims, 3 Drawing Figures

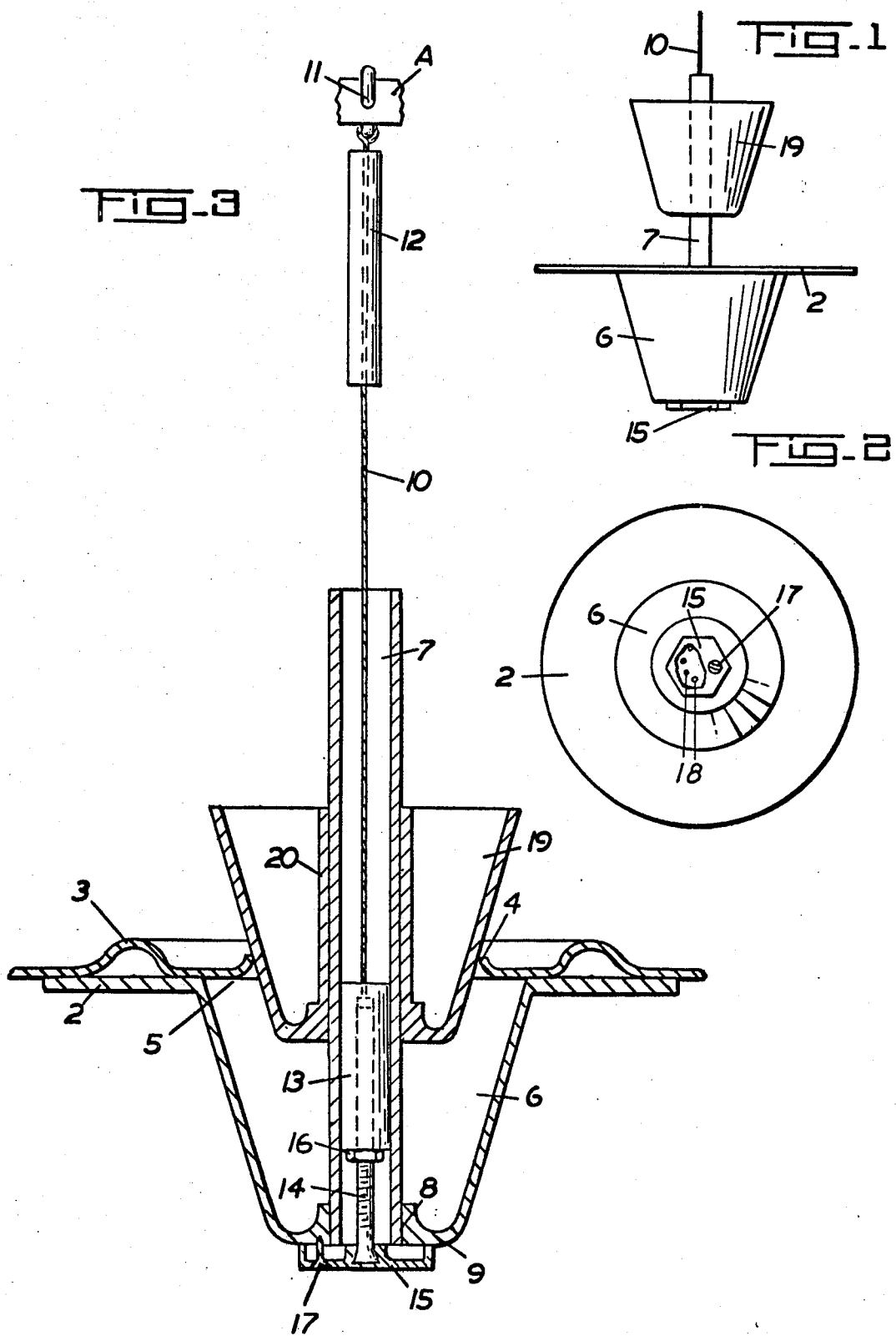

WHEEL BALANCING DEVICE

CROSS-REFERENCE TO RELATED APPLICATIONS

This application is a continuation-in-part of my application Ser. No. 574,227, filed May 5, 1975, now abandoned which is a continuation of my application Ser. No. 426,374, filed Dec. 19, 1973, now abandoned.

FIELD OF THE INVENTION

This invention is concerned with improvements in or relating to static wheel balancing devices and is particularly but not exclusively directed to such a device for use with automobile wheels.

DESCRIPTION OF THE PRIOR ART

The prior art discloses a number of static wheel balancing devices on which the wheel to be balanced is mounted with a tube projecting vertically upwards through and centrally of the wheel hub orifice, the device being suspended from the lower end of a plumb-line extending through the centre of the tube. The balancing of the wheel is effected by positioning balancing weights thereon until the suspending plumb-line is centered within the tube. A device of this kind is dislcosed for example in U.S. Pat. Ser. No. 2,919,582 issued to Barnard B. Riedel. The apparatus disclosed by Riedel consists of a tapered cone fitting into the central wheel aperture cooperating with a cup-shaped member fastened to the tapered cone by a bolt protruding through the bottom of the cup.

U.S. Pat. No. 2,172,006 issued to O. S. Buckner et al. discloses apparatus for balancing abrasive wheels during fabrication having a suspension system with a movable point of engagement along a suspension wire to determine the sensitivity of the device.

DEFINITION OF THE INVENTION

It is an object of the present invention to provide a new wheel balancing device.

In accordance with the present invention there is provided a wheel balancing device adapted for suspension upon the lower end of a flexible cable which is in turn adapted for suspension by hook means from a support, the device comprising:

a wheel supporting member;

a wheel centering member; and a device suspension means including the said flexible cable and the said hook means;

the wheel supporting member comprising an annular wheel supporting plate having upper and lower surfaces and a central aperture, which when suspended in operation is positioned in a horizontal plane, a cup-shaped member extending from the lower face of the plate around the central aperture, and a hollow tube fastened rigidly to the bottom of the cup-shaped member so as to extend perpendicularly of the plane of the plate through the central aperture to extend a substantial distance above the plane of the plate;

the device providing a horizontal flat bottom surface upon which the device will stand upon a horizontal support surface with the said supporting plate horizontal to receive a wheel;

the wheel centering means being constituted by an inverted extended truncated conical body having a central aperture by which the body is slidable without appreciable play upon the said tube to enter and engage the hub orifice of a wheel supported upon the plate whereby the hub orifice is held by the inverted conical body concentric with the tube;

the said central aperture of the conical body permitting passage of the said hook means therethrough to permit the centering means to be threaded on the flexible cable and to be engaged with the tube while the device is resting upon the said horizontal support surface with the wheel supported thereon;

the suspension means including vertically movable means within the tube to which the lower end of the flexible cable is attached, and means for fixing the position of the vertically movable means within the tube for adjustment of the sensitivity of the balance of the device.

DESCRIPTION OF THE DRAWING

A particular preferred embodiment of the invention will now be described, by way of example, with reference to the accompanying diagrammatic drawing in which:

FIG. 1 is a general side-elevational view of the device,

FIG. 2 is a plan view of the device from below, and

FIG. 3 is an enlarged vertical cross-sectional view through the device showing the hub portion of an automobile wheel resting thereon.

The static wheel balancing device of the invention is a simple but accurate arrangement wherein a suspended wheel-carrying element comprises an annular wheel supporting plate 2 having a flat top surface upon which a wheel 3 to be balanced is placed with its hub orifice 4 substantially concentric with a central circular orifice 5 in the plate. The bottom face of the plate is formed integrally with a cup 6, the cup being of inverted frustro-conical form and having its circular upper edge merging into the circular rim of the orifice 5.

One end of a vertical tube 7 (which in operation will be the lower end) is secured within a centrally disposed orifice 8 in the bottom 9 of the cup 6. The tube 7 projects vertically upwards through the cup and centrally of the wheel supporting plate orifice 5, it being a requirement that the vertical axis of the tube be permanently set perpendicular to the flat top surface of the plate 2. The said wheel carrying element is held in suspension by its attachment to the lower end of an elongated flexible cable 10 extending exactly centrally through the bore of the tube 7, the upper end of the cable carrying a hook 11 for attachment to any suitable support, e.g., as indicated by reference A. A handgrip sleeve 12 is mounted around the cable adjacent to the hook for grasping by the operator's hand.

The lower end of the cable 10 is fastened in any suitable manner inside a plug 13, the cable extending from the centre of the top face of the plug 13, which is a close sliding fit within the lower portion of the bore of the tube 7. To retain the plug in place and also to permit vertical adjustment of the plug in the bore an adjusting screw 14 is threaded into the lower portion of the plug, with the head 15 of the screw bearing against the bottom face of the cup 6. A lock nut 16 is carried upon the screw for engagement with the lower face of the plug, and thus retains the plug in any desired position along the length of the screw.

The cable, plug and screw assembly are retained against movement in the tube 7 by means of a locking screw 17, which extends through the screw head 15 and can be threaded into one of several holes 18 provided in the bottom face of the cup.

The sensitivity of the device to imbalance of the wheel placed upon the wheel supporting member is dependent upon the vertical distance between the point of suspension of the device and the centre of gravity of the combination of device and suspended wheel, this distance being the lever arm through which the out-of-balance force is applied to tilt the disc 2, so that the cable is no longer centrally disposed within the tube 7. If this lever arm is too long or too short the device is too sensitive, or too insensitive respectively, for practical use. The sensitivity will depend upon the size, structure, etc., of the wheel rim and the tire mounted thereon; once set for a particular combination usually it will not need to be changed again, unless a new combination is to be balanced.

A simple test with a balance weight of the minimum size commonly used will show whether the sensitivity requires adjustment. Such adjustment may readily be obtained by removing the locking screw 17 and carefully pulling the screw 14 and attached plug 13 and the cable out of the tube 7. The lock nut is loosened and the screw 14 rotated to adjust the distance of the plug 13 from the head of screw 14. The plug and screw are then returned and another test made for corrected sensitivity. This operation may need to be repeated one or more times until satisfactory sensitivity is obtained, and at which time the lock nut 16 is screwed home against the plug 14, the plug and screw returned to position and the locking screw 17 threaded into the nearest adjacent hole 18.

If an accurate balance is to be obtained the hub orifice of a wheel to be balanced must be accurately centered in relation to the tube 7 and the taut cable 10 extending centrally therethrough. For this purpose a centering member 19 is provided slidable upon the tube 7, the member being of hollow inverted frustro conical form and comprising an open-ended sleeve 20 extending exactly centrally vertically therethrough, the sleeve being a close sliding fit upon the tube 7. Prior to the placement of a wheel to be balanced upon the top face of the plate 2 the centering member 19 is lifted upwardly and removed, the end of the cable 10 and its suspension hook 11 being withdrawn through the bore of the centering member sleeve 20. It is of utmost importance in obtaining an accurate indication of balance that the wheel rests securely upon the flat upper face of the plate 2 while the member 19 is moved downwards, so that the wheel cannot be tilted relative to the tube 7 and the suspension member. To this end, the wheel carryng element can now be placed upon a horizontal surface such as the ground and will sit stably thereon in the upright posture illustrated with the plate 2 horizontal, on the relatively large flat surface provided by the head 15 of screw 14. The wheel to be balanced is next placed, with the outside face of the wheel uppermost, upon the top face of the plate 2, whereupon the tube 7 will extend upward through the wheel centre hole well clear of the wheel. The centering member 19 is now repositioned upon the tube 7, the cable hook 11 threading easily through the tube 7, and the cable hook 13 attached to the support A, whereby the whole assembly including the wheel is supported in suspension. It will be apparent therefore that there is a minimum of handling required of the heavy and awkward wheel and tire while the device is assembled thereon.

If the cable 10 is not sufficiently central in the top of the bore of the tube 7, indicating that the wheel is out of balance, the usual procedure is carried out of arranging a weight or weights of suitable size upon the wheel rim to achieve balance, as indicated by the centering of the cable in relation to the tube bore. Because of the conical shape of the exterior surface of the member 19 it will fit snugly and firmly into wheels, etc., with a wide range of central apertures of different sizes by simply sliding along the tube 7. The exterior surface of the centering member 19 is made of a shape such that with the device not in use it can be snugly fitted inside the cup-shaped part 6, so that the device can be stored and packed in a box of convenient size.

For convenience in terminology and description the apparatus of the invention is referred to as a wheel balancing device. However it is of course also usable to balance other symmetrical devices having the same general physical characteristics as a wheel.

Although a particular embodiment of the invention has been shown and disclosed it is to be understood that changes or alterations may be made as are deemed necessary without departing from the scope of the invention as set out in the appended claims.

I claim:

1. A wheel balancing device adapted for suspension upon the lower end of a flexible cable which is in turn adapted for suspension by hook means from a support, the device comprising:

a wheel supporting member;

a wheel centering member; and a device suspension means including the said flexible cable and the said hook means;

the wheel supporting member comprising an annular wheel supporting plate having upper and lower surfaces and a central aperture, which when suspended in operation is positioned in a horizontal plane, a cup-shaped member extending from the lower face of the plate around the central aperture, and a hollow tube fastened rigidly to the bottom of the cup-shaped member so as to extend perpendicularly of the plane of the plate through the central aperture to extend a substantial distance above the plane of the plate;

the device providing a horizontal flat bottom surface upon which the device will stand upon a horizontal support surface with the said supporting plate horizontal to receive a wheel;

the wheel centering means being constituted by an inverted extended truncated conical body having a central aperture by which the body is slidable without appreciable play upon the said tube to enter and engage the hub orifice of a wheel supported upon the plate whereby the hub orifice is held by the inverted conical body concentric with the tube;

the said central aperture of the conical body permitting passage of the said hook means therethrough to permit the centering means to be threaded on the flexible cable and to be engaged with the tube while the device is resting upon the said horizontal support surface with the wheel supported thereon;

the suspension means including vertically movable means within the tube to which the lower end of the flexible cable is attached, and means for fixing the position of the vertically movable means within the tube for adjustment of the sensitivity of the balance of the device.

2. A wheel balancing device as claimed in claim 1, wherein the cup-shaped member comprises an inverted conical shell connected at its rim to the wheel supporting plate and having the hollow tube connected to its base, the said conical shell being internally dimensioned to snugly receive the wheel centering means when the device is out of use.

3. A wheel balancing device as claimed in claim 1, wherein the vertically movable means within the tube comprises a plug freely slidable within the tube, and an adjustment screw extending freely through the tube from the exterior thereof and threaded into the plug.

4. A wheel balancing device as claimed in claim 2, wherein the vertically movable means within the tube comprises a plug freely slidable within the tube, and an adjustment screw extending freely through the tube from the exterior thereof and threaded into the plug.

* * * * *